US 7,525,055 B2

(12) United States Patent
Gass et al.

(10) Patent No.: US 7,525,055 B2
(45) Date of Patent: Apr. 28, 2009

(54) SWITCH BOX FOR POWER TOOLS WITH SAFETY SYSTEMS

(75) Inventors: Stephen F. Gass, Wilsonville, OR (US);
J. David Fulmer, Tualatin, OR (US);
David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 11/401,774

(22) Filed: Apr. 11, 2006

(65) Prior Publication Data

US 2006/0180451 A1    Aug. 17, 2006

Related U.S. Application Data

(63) Continuation of application No. 11/027,322, filed on Dec. 31, 2004, now abandoned, and a continuation of application No. 09/676,190, filed on Sep. 29, 2000, now Pat. No. 7,055,417, and a continuation of application No. 09/292,221, filed on Aug. 13, 2001, now Pat. No. 7,284,467, and a continuation of application No. 09/292,227, filed on Aug. 13, 2001, now Pat. No. 7,308,843, and a continuation of application No. 09/929,234, filed on Aug. 13, 2001, now Pat. No. 7,225,712, and a continuation of application No. 09/929,235, filed on Aug. 13, 2001, now Pat. No. 7,350,444, and a continuation of application No. 09/929,236, filed on Aug. 13, 2001, and a continuation of application No. 09/929,237, filed on Aug. 13, 2001, and a continuation of application No. 09/929,238, filed on Aug. 13, 2001, now abandoned, and a continuation of application No. 09/929,240, filed on Aug. 13, 2001, (Continued)

(60) Provisional application No. 60/157,340, filed on Oct. 1, 1999, provisional application No. 60/182,866, filed on Feb. 16, 2000, provisional application No. 60/533,598, filed on Dec. 31, 2003.

(51) Int. Cl.
*H01H 9/26* (2006.01)
(52) U.S. Cl. .................................. 200/50.37
(58) Field of Classification Search ............... 200/50.37
See application file for complete search history.

(56) References Cited

U.S. PATENT DOCUMENTS

| 0,146,886 A | 1/1874 | Doane et al. |
| 0,162,814 A | 5/1875 | Graves et al. |
| 0,261,090 A | 7/1882 | Grill |
| 0,264,412 A | 9/1882 | Kuhlmann |
| 0,299,480 A | 5/1884 | Kuhlman et al. |

(Continued)

FOREIGN PATENT DOCUMENTS

| CA | 2140991 | 1/1995 |
| CH | 297525 | 6/1954 |

(Continued)

OTHER PUBLICATIONS

Sink Drain Plug Lifter, circa 1974.
Craftsman® Power and Hand Tools, pp. 142-143, 2003.
Skil Model 3400-Type 1 10 Table Saw Parts List and Technical Bulletin, S-B Power Tool Company, Jun. 1993.
Shop Fox® Fence Operating Manual, Woodstock International, Inc., 1996, revised May 1997.

(Continued)

*Primary Examiner*—Elvin G Enad
*Assistant Examiner*—Lheiren Mae A Anglo

(57) ABSTRACT

Switch boxes for power tools with safety systems are disclosed. The switch boxes are particularly useful for woodworking equipment such as table saws equipped with safety systems that detect and react to dangerous conditions. The switch boxes may include a power switch, a start/stop switch, a bypass switch and a visual indicator.

9 Claims, 6 Drawing Sheets

Related U.S. Application Data now Pat. No. 7,100,483, and a continuation of application No. 09/929,242, filed on Aug. 13, 2001, and a continuation of application No. 09/929,425, filed on Aug. 13, 2001, now Pat. No. 7,137,326, and a continuation of application No. 09/929,426, filed on Aug. 13, 2001, now Pat. No. 7,210,383, and a continuation of application No. 10/053,390, filed on Jan. 16, 2002, now Pat. No. 7,377,199, and a continuation of application No. 10/100,211, filed on Mar. 13, 2002, and a continuation of application No. 10/146,527, filed on May 15, 2002, and a continuation of application No. 10/172,553, filed on Jun. 13, 2002, now Pat. No. 7,231,856, and a continuation of application No. 10/189,027, filed on Jul. 2, 2002, and a continuation of application No. 10/189,031, filed on Jul. 2, 2002, now Pat. No. 7,171,879, and a continuation of application No. 10/243,042, filed on Sep. 13, 2002, now Pat. No. 7,197,969, and a continuation of application No. 10/292,607, filed on Nov. 12, 2002, now Pat. No. 7,077,039, and a continuation of application No. 10/341,260, filed on Jan. 13, 2003, now abandoned, and a continuation of application No. 10/345,630, filed on Jan. 15, 2003, and a continuation of application No. 10/643,296, filed on Aug. 18, 2003, now abandoned, and a continuation of application No. 10/794,161, filed on Mar. 4, 2004, now Pat. No. 7,098,800, and a continuation of application No. 10/923,273, filed on Aug. 20, 2004, now Pat. No. 7,350,445, and a continuation of application No. 10/923,282, filed on Aug. 20, 2004, now abandoned, and a continuation of application No. 10/923,290, filed on Aug. 20, 2004, and a continuation of application No. 10/932,339, filed on Sep. 1, 2004, now Pat. No. 7,290,472, and a continuation of application No. 10/984,643, filed on Nov. 8, 2004, and a continuation of application No. 11/026,006, filed on Dec. 31, 2004, and a continuation of application No. 11/026,114, filed on Dec. 31, 2004, and a continuation of application No. 11/027,254, filed on Dec. 31, 2004, now abandoned, and a continuation of application No. 11/027,322, filed on Dec. 31, 2004, now abandoned, and a continuation of application No. 11/027,600, filed on Dec. 31, 2004, and a continuation of application No. 11/045,972, filed on Jan. 28, 2005, and a continuation of application No. 11/061,162, filed on Feb. 18, 2005, now Pat. No. 7,228,772, and a continuation of application No. 11/098,984, filed on Apr. 4, 2005, now Pat. No. 7,353,737, and a continuation of application No. 11/107,499, filed on Apr. 15, 2005, and a continuation of application No. 11/190,111, filed on Jul. 25, 2005, now Pat. No. 7,357,056, and a continuation of application No. 11/208,214, filed on Aug. 19, 2005, and a continuation of application No. 11/218,356, filed on Sep. 2, 2005, and a continuation of application No. 11/256,757, filed on Oct. 24, 2005, and a continuation of application No. 11/348,580, filed on Feb. 6, 2006, and a continuation of application No. 11/353,423, filed on Feb. 13, 2006, and a continuation of application No. 11/395,502, filed on Mar. 31, 2006, and a continuation of application No. 11/401,050, filed on Apr. 10, 2006.

U.S. PATENT DOCUMENTS

| Patent No. | | Date | Inventor |
|---|---|---|---|
| 0,302,041 | A | 7/1884 | Sill |
| 0,307,112 | A | 10/1884 | Groff |
| 0,509,253 | A | 11/1893 | Shields |
| 0,545,504 | A | 9/1895 | Hoover |
| 0,869,513 | A | 10/1907 | Pfeil |
| 0,941,726 | A | 11/1909 | Pfalzgraf |
| 0,982,312 | A | 1/1911 | Swafford |
| 0,997,720 | A | 7/1911 | Troupenat |
| 1,037,843 | A | 9/1912 | Ackley |
| 1,050,649 | A | 1/1913 | Harrold et al. |
| 1,054,558 | A | 2/1913 | Jones |
| 1,074,198 | A | 9/1913 | Phillips |
| 1,082,870 | A | 12/1913 | Humason |
| 1,101,515 | A | 6/1914 | Adam |
| 1,126,970 | A | 2/1915 | Folmer |
| 1,132,129 | A | 3/1915 | Stevens |
| 1,148,169 | A | 7/1915 | Howe |
| 1,154,209 | A | 9/1915 | Rushton |
| 1,205,246 | A | 11/1916 | Mowry |
| 1,228,047 | A | 5/1917 | Reinhold |
| 1,240,430 | A | 9/1917 | Erickson |
| 1,244,187 | A | 10/1917 | Frisbie |
| 1,255,886 | A | 2/1918 | Jones |
| 1,258,961 | A | 3/1918 | Tattersall |
| 1,311,508 | A | 7/1919 | Harrold |
| 1,324,136 | A | 12/1919 | Turner |
| 1,381,612 | A | 6/1921 | Anderson |
| 1,397,606 | A | 11/1921 | Smith |
| RE15,262 | E | 1/1922 | Gurgel |
| 1,427,005 | A | 8/1922 | McMichael |
| 1,430,983 | A | 10/1922 | Granberg |
| 1,450,906 | A | 4/1923 | Anderson |
| 1,464,924 | A | 8/1923 | Drummond |
| 1,465,224 | A | 8/1923 | Lantz |
| 1,492,145 | A | 4/1924 | Talley |
| 1,496,212 | A | 6/1924 | French |
| 1,511,797 | A | 10/1924 | Berghold |
| 1,526,128 | A | 2/1925 | Flohr |
| 1,527,587 | A | 2/1925 | Hutchinson |
| 1,551,900 | A | 9/1925 | Morrow |
| 1,553,996 | A | 9/1925 | Federer |
| 1,582,483 | A | 4/1926 | Runyan |
| 1,590,988 | A | 6/1926 | Campbell |
| 1,600,604 | A | 6/1926 | Sorlien |
| 1,616,478 | A | 2/1927 | Watson |
| 1,640,517 | A | 8/1927 | Procknow |
| 1,662,372 | A | 3/1928 | Ward |
| 1,668,061 | A | 5/1928 | Falkins |
| 1,701,948 | A | 2/1929 | Crowe |
| 1,711,490 | A | 5/1929 | Dummond |
| 1,712,828 | A | 5/1929 | Klehm |
| 1,774,521 | A | 9/1930 | Neighbour |
| 1,807,120 | A | 5/1931 | Lewis |
| 1,811,066 | A | 6/1931 | Tannewitz |
| 1,879,280 | A | 9/1932 | James |
| 1,896,924 | A | 2/1933 | Ulrich |
| 1,902,270 | A | 3/1933 | Tate |
| 1,904,005 | A | 4/1933 | Masset |
| 1,910,651 | A | 5/1933 | Tautz |
| 1,938,548 | A | 12/1933 | Tautz |
| 1,938,549 | A | 12/1933 | Tautz |
| 1,963,688 | A | 6/1934 | Tautz |
| 1,988,102 | A | 1/1935 | Woodward |
| 1,993,219 | A | 3/1935 | Merrigan |
| 2,007,887 | A | 7/1935 | Tautz |
| 2,010,851 | A | 8/1935 | Dummond |
| 2,020,222 | A | 11/1935 | Tautz |
| 2,038,810 | A | 4/1936 | Tautz |
| 2,044,481 | A | 6/1936 | Manley et al. |
| 2,075,282 | A | 3/1937 | Hedgpeth |
| 2,095,330 | A | 10/1937 | Hedgpeth |
| 2,106,288 | A | 1/1938 | Tautz |
| 2,106,321 | A | 1/1938 | Guertin |
| 2,121,069 | A | 6/1938 | Collins |
| 2,131,492 | A | 9/1938 | Ocenasek |
| 2,163,320 | A | 6/1939 | Hammond |
| 2,168,282 | A | 8/1939 | Tautz |
| 2,241,556 | A | 5/1941 | MacMillin et al. |
| 2,261,696 | A | 11/1941 | Ocenasek |
| 2,265,407 | A | 12/1941 | Tautz |
| 2,286,589 | A | 6/1942 | Tannewitz |
| 2,292,872 | A | 8/1942 | Eastman |
| 2,299,262 | A | 10/1942 | Uremovich |

| | | | | | |
|---|---|---|---|---|---|
| 2,312,118 A | 2/1943 | Neisewander | 3,184,001 A | 5/1965 | Reinsch et al. |
| 2,313,686 A | 3/1943 | Uremovich | 3,186,256 A | 6/1965 | Reznick |
| 2,328,244 A | 8/1943 | Woodward | 3,207,273 A | 9/1965 | Jurin |
| 2,352,235 A | 6/1944 | Tautz | 3,213,731 A | 10/1965 | Renard |
| 2,377,265 A | 3/1945 | Rady | 3,224,474 A | 12/1965 | Bloom |
| 2,392,486 A | 1/1946 | Larsen | 3,232,326 A | 2/1966 | Speer et al. |
| 2,402,232 A | 6/1946 | Baker | 3,246,205 A | 4/1966 | Miller |
| 2,425,331 A | 8/1947 | Kramer | 3,249,134 A | 5/1966 | Vogl et al. |
| 2,434,174 A | 1/1948 | Morgan | 3,274,876 A | 9/1966 | Debus |
| 2,452,589 A | 2/1948 | McWhirter et al. | 3,276,497 A | 10/1966 | Heer |
| 2,466,325 A | 4/1949 | Ocenasek | 3,306,149 A | 2/1967 | John |
| 2,496,613 A | 2/1950 | Wooward | 3,313,185 A | 4/1967 | Drake et al. |
| 2,501,134 A | 3/1950 | Meckoski et al. | 3,315,715 A | 4/1967 | Mytinger |
| 2,509,813 A | 5/1950 | Dineen | 3,323,814 A | 6/1967 | Phillips |
| 2,517,649 A | 8/1950 | Frechtmann | 3,337,008 A | 8/1967 | Trachte |
| 2,518,684 A | 8/1950 | Harris | 3,356,111 A | 12/1967 | Mitchell |
| 2,530,290 A | 11/1950 | Collins | 3,368,596 A | 2/1968 | Corner |
| 2,554,124 A | 5/1951 | Salmont | 3,386,322 A | 6/1968 | Stone et al. |
| 2,562,396 A | 7/1951 | Schutz | 3,439,183 A | 4/1969 | Hurst, Jr. |
| 2,572,326 A | 10/1951 | Evans | 3,445,835 A | 5/1969 | Fudaley |
| 2,590,035 A | 3/1952 | Pollak | 3,454,286 A | 7/1969 | Anderson et al. |
| 2,593,596 A | 4/1952 | Olson | 3,456,696 A | 7/1969 | Gregory et al. |
| 2,601,878 A | 7/1952 | Anderson | 3,512,440 A | 5/1970 | Frydmann |
| 2,623,555 A | 12/1952 | Eschenburg | 3,538,964 A | 11/1970 | Warrick et al. |
| 2,625,966 A | 1/1953 | Copp | 3,540,338 A | 11/1970 | McEwan et al. |
| 2,626,639 A | 1/1953 | Hess | 3,554,067 A | 1/1971 | Scutella |
| 2,661,777 A | 12/1953 | Hitchcock | 3,566,934 A | 3/1971 | Thrasher |
| 2,661,780 A | 12/1953 | Morgan | 3,566,996 A | 3/1971 | Crossman |
| 2,675,707 A | 4/1954 | Brown | 3,580,376 A | 5/1971 | Loshbough |
| 2,678,071 A | 5/1954 | Odlum et al. | 3,581,784 A | 6/1971 | Warrick |
| 2,690,084 A | 9/1954 | Van Dam | 3,593,266 A | 7/1971 | Van Sickle |
| 2,695,638 A | 11/1954 | Gaskell | 3,613,748 A | 10/1971 | De Pue |
| 2,704,560 A | 3/1955 | Woessner | 3,621,894 A | 11/1971 | Niksich |
| 2,711,762 A | 6/1955 | Gaskell | 3,648,126 A | 3/1972 | Boos et al. |
| 2,719,547 A | 10/1955 | Gjerde | 3,670,788 A | 6/1972 | Pollak et al. |
| 2,722,246 A | 11/1955 | Arnoldy | 3,675,444 A | 7/1972 | Whipple |
| 2,731,049 A | 1/1956 | Akin | 3,680,609 A | 8/1972 | Menge |
| 2,736,348 A | 2/1956 | Nelson | 3,688,815 A | 9/1972 | Ridenour |
| 2,737,213 A | 3/1956 | Richards et al. | 3,695,116 A | 10/1972 | Baur |
| 2,758,615 A | 8/1956 | Mastriforte | 3,696,844 A | 10/1972 | Bernatschek |
| 2,785,710 A | 3/1957 | Mowery, Jr. | 3,716,113 A | 2/1973 | Kobayashi et al. |
| 2,786,496 A | 3/1957 | Eschenburg | 3,719,103 A | 3/1973 | Streander |
| 2,804,890 A | 9/1957 | Fink | 3,740,000 A | 6/1973 | Takada |
| 2,810,408 A | 10/1957 | Boice et al. | 3,745,546 A | 7/1973 | Struger et al. |
| 2,839,943 A | 6/1958 | Caldwell et al. | 3,749,933 A | 7/1973 | Davidson |
| 2,844,173 A | 7/1958 | Gaskell | 3,754,493 A | 8/1973 | Niehaus et al. |
| 2,850,054 A | 9/1958 | Eschenburg | 3,772,590 A | 11/1973 | Mikulecky et al. |
| 2,852,047 A | 9/1958 | Odlum et al. | 3,785,230 A | 1/1974 | Lokey |
| 2,873,773 A | 2/1959 | Gaskell | 3,793,915 A | 2/1974 | Huier |
| 2,876,809 A | 3/1959 | Rentsch et al. | 3,805,639 A | 4/1974 | Peter |
| 2,883,486 A | 4/1959 | Mason | 3,805,658 A | 4/1974 | Scott et al. |
| 2,894,546 A | 7/1959 | Eschenburg | 3,808,932 A | 5/1974 | Russell |
| 2,913,025 A | 11/1959 | Richards | 3,829,850 A | 8/1974 | Guetersloh |
| 2,913,581 A | 11/1959 | Simonton et al. | 3,829,970 A | 8/1974 | Anderson |
| 2,937,672 A | 5/1960 | Gjerde | 3,858,095 A | 12/1974 | Friemann et al. |
| 2,945,516 A | 7/1960 | Edgemond, Jr. et al. | 3,861,016 A | 1/1975 | Johnson et al. |
| 2,954,118 A | 9/1960 | Anderson | 3,863,208 A | 1/1975 | Balban |
| 2,957,166 A | 10/1960 | Gluck | 3,874,747 A | 4/1975 | Case et al. |
| 2,978,084 A | 4/1961 | Vilkaitis | 3,880,032 A | 4/1975 | Green |
| 2,984,268 A | 5/1961 | Vuichard | 3,882,744 A | 5/1975 | McCarroll |
| 2,991,593 A | 7/1961 | Cohen | 3,886,413 A | 5/1975 | Dow et al. |
| 3,005,477 A | 10/1961 | Sherwen | 3,889,567 A | 6/1975 | Sato et al. |
| 3,007,501 A | 11/1961 | Mundell et al. | 3,905,263 A | 9/1975 | Smith |
| 3,011,529 A | 12/1961 | Copp | 3,922,785 A | 12/1975 | Fushiya |
| 3,011,610 A | 12/1961 | Stiebel et al. | 3,924,688 A | 12/1975 | Cooper et al. |
| 3,013,592 A | 12/1961 | Ambrosio et al. | 3,931,727 A | 1/1976 | Luenser |
| 3,021,881 A | 2/1962 | Edgemond, Jr. et al. | 3,935,777 A | 2/1976 | Bassett |
| 3,035,995 A | 5/1962 | Seeley et al. | 3,945,286 A | 3/1976 | Smith |
| 3,047,116 A | 7/1962 | Stiebel et al. | 3,946,631 A | 3/1976 | Malm |
| 3,085,602 A | 4/1963 | Gaskell | 3,947,734 A | 3/1976 | Flyer |
| 3,105,530 A | 10/1963 | Peterson | 3,949,636 A | 4/1976 | Ball et al. |
| 3,129,731 A | 4/1964 | Tyrrell | 3,953,770 A | 4/1976 | Hayashi |
| 3,163,732 A | 12/1964 | Abbott | 3,960,310 A | 6/1976 | Nussbaum |

| | | | | | |
|---|---|---|---|---|---|
| 3,967,161 A | 6/1976 | Lichtblau | 4,576,073 A | 3/1986 | Stinson |
| 3,970,178 A | 7/1976 | Densow | 4,589,047 A | 5/1986 | Gaus et al. |
| 3,974,565 A | 8/1976 | Ellis | 4,589,860 A | 5/1986 | Brandenstein et al. |
| 3,975,600 A | 8/1976 | Marston | 4,599,597 A | 7/1986 | Rotbart |
| 3,978,624 A | 9/1976 | Merkel et al. | 4,599,927 A | 7/1986 | Eccardt et al. |
| 3,994,192 A | 11/1976 | Faig | 4,606,251 A | 8/1986 | Boileau |
| 4,007,679 A | 2/1977 | Edwards | 4,615,247 A | 10/1986 | Berkeley |
| 4,016,490 A | 4/1977 | Weckenmann et al. | 4,617,544 A | 10/1986 | Mooz et al. |
| 4,026,174 A | 5/1977 | Fierro | 4,621,300 A | 11/1986 | Summerer |
| 4,026,177 A | 5/1977 | Lokey | 4,625,406 A | 12/1986 | Fushiya et al. |
| 4,029,159 A | 6/1977 | Nymann | 4,625,604 A | 12/1986 | Handler et al. |
| 4,047,156 A | 9/1977 | Atkins | 4,635,364 A | 1/1987 | Noll et al. |
| 4,048,886 A | 9/1977 | Zettler | 4,637,188 A | 1/1987 | Crothers |
| 4,060,160 A | 11/1977 | Lieber | 4,637,289 A | 1/1987 | Ramsden |
| 4,063,777 A | 12/1977 | Takada | 4,638,393 A | 1/1987 | Oishi et al. |
| 4,070,940 A | 1/1978 | McDaniel et al. | 4,644,832 A | 2/1987 | Smith |
| 4,075,961 A | 2/1978 | Harris | 4,653,189 A | 3/1987 | Andreasson |
| 4,077,161 A | 3/1978 | Wyle et al. | 4,657,428 A | 4/1987 | Wiley |
| 4,085,303 A | 4/1978 | McIntyre et al. | 4,661,797 A | 4/1987 | Schmall |
| 4,090,345 A | 5/1978 | Harkness | 4,672,500 A | 6/1987 | Tholome et al. |
| 4,091,698 A | 5/1978 | Obear et al. | 4,675,664 A | 6/1987 | Cloutier et al. |
| 4,106,378 A | 8/1978 | Kaiser | 4,679,719 A | 7/1987 | Kramer |
| 4,117,752 A | 10/1978 | Yoneda | 4,683,660 A | 8/1987 | Schurr |
| 4,138,905 A | 2/1979 | Konishi | 4,694,721 A | 9/1987 | Brickner, Jr. |
| 4,145,940 A | 3/1979 | Woloveke et al. | 4,718,229 A | 1/1988 | Riley |
| 4,152,833 A | 5/1979 | Phillips | 4,721,023 A | 1/1988 | Bartlett et al. |
| 4,161,649 A | 7/1979 | Klos et al. | 4,722,021 A | 1/1988 | Hornung et al. |
| 4,175,452 A | 11/1979 | Idel | 4,751,603 A | 6/1988 | Kwan |
| 4,184,394 A | 1/1980 | Gjerde | 4,756,220 A | 7/1988 | Olsen et al. |
| 4,190,000 A | 2/1980 | Shaull et al. | 4,757,881 A | 7/1988 | Jonsson et al. |
| 4,195,722 A | 4/1980 | Anderson et al. | 4,774,866 A | 10/1988 | Dehari et al. |
| 4,199,930 A | 4/1980 | Lebet et al. | 4,792,965 A | 12/1988 | Morgan |
| 4,200,002 A | 4/1980 | Takahashi | 4,805,504 A | 2/1989 | Fushiya et al. |
| 4,206,666 A | 6/1980 | Ashton | 4,805,505 A | 2/1989 | Cantlin |
| 4,206,910 A | 6/1980 | Biesemeyer | 4,819,501 A | 4/1989 | Kraus et al. |
| 4,249,117 A | 2/1981 | Leukhardt et al. | 4,831,279 A | 5/1989 | Ingraham |
| 4,249,442 A | 2/1981 | Fittery | 4,840,135 A | 6/1989 | Yamauchi |
| 4,251,599 A | 2/1981 | McCormick | 4,845,476 A | 7/1989 | Rangeard et al. |
| 4,255,995 A | 3/1981 | Connor | 4,864,455 A | 9/1989 | Shimomura et al. |
| 4,262,278 A | 4/1981 | Howard et al. | 4,875,398 A | 10/1989 | Taylor et al. |
| 4,267,914 A | 5/1981 | Saar | 4,888,869 A | 12/1989 | Leatherman |
| 4,270,427 A | 6/1981 | Colberg et al. | 4,896,607 A | 1/1990 | Hall et al. |
| 4,276,459 A * | 6/1981 | Willett et al. ............ 200/43.17 | 4,906,962 A | 3/1990 | Duimstra |
| 4,276,799 A | 7/1981 | Muehling | 4,907,679 A | 3/1990 | Menke |
| 4,288,048 A | 9/1981 | Sieben | 4,934,233 A | 6/1990 | Brundage et al. |
| 4,291,794 A | 9/1981 | Bauer | 4,936,876 A | 6/1990 | Reyes |
| 4,302,879 A | 12/1981 | Murray | 4,937,554 A | 6/1990 | Herman |
| 4,305,442 A | 12/1981 | Currie | 4,962,685 A | 10/1990 | Hagstrom |
| 4,319,146 A | 3/1982 | Wires, Sr. | 4,964,450 A | 10/1990 | Hughes et al. |
| 4,321,841 A | 3/1982 | Felix | 4,965,909 A | 10/1990 | McCullough et al. |
| 4,334,450 A | 6/1982 | Benuzzi | 4,969,063 A * | 11/1990 | Scott et al. ................. 361/93.1 |
| 4,370,810 A | 2/1983 | Schurr et al. | 4,975,798 A | 12/1990 | Edwards et al. |
| 4,372,202 A | 2/1983 | Cameron | 5,020,406 A | 6/1991 | Sasaki et al. |
| 4,374,552 A | 2/1983 | Dayen | 5,025,175 A | 6/1991 | Dubois, III |
| 4,385,539 A | 5/1983 | Meyerhoefer et al. | 5,042,348 A | 8/1991 | Brundage et al. |
| 4,391,358 A | 7/1983 | Haeger | 5,046,426 A | 9/1991 | Julien et al. |
| 4,418,597 A | 12/1983 | Krusemark et al. | 5,052,255 A | 10/1991 | Gaines |
| 4,427,042 A * | 1/1984 | Mitchell et al. ............... 144/1.1 | 5,067,366 A | 11/1991 | Gandiglio |
| 4,466,170 A | 8/1984 | Davis | 5,074,047 A | 12/1991 | King |
| 4,466,233 A | 8/1984 | Thesman | 5,081,406 A | 1/1992 | Hughes et al. |
| 4,470,046 A | 9/1984 | Betsill | 5,082,316 A | 1/1992 | Wardlaw |
| 4,492,291 A | 1/1985 | Chometon et al. | 5,083,973 A | 1/1992 | Townsend |
| 4,503,739 A | 3/1985 | Konieczka | 5,086,890 A | 2/1992 | Turczyn et al. |
| 4,510,489 A | 4/1985 | Anderson, III et al. | 5,094,000 A | 3/1992 | Becht et al. |
| 4,512,224 A | 4/1985 | Terauchi | 5,116,249 A | 5/1992 | Shiotani et al. |
| 4,518,043 A | 5/1985 | Anderson et al. | 5,119,555 A | 6/1992 | Johnson |
| 4,532,501 A | 7/1985 | Hoffman | 5,122,091 A | 6/1992 | Townsend |
| 4,532,844 A | 8/1985 | Chang et al. | 5,123,317 A | 6/1992 | Barnes, Jr. et al. |
| 4,557,168 A | 12/1985 | Tokiwa | 5,125,160 A | 6/1992 | Gassen |
| 4,559,858 A | 12/1985 | Laskowski et al. | 5,146,714 A | 9/1992 | Liiber |
| 4,560,033 A | 12/1985 | DeWoody et al. | 5,156,508 A | 10/1992 | Grisley |
| 4,566,512 A | 1/1986 | Wilson | 5,174,349 A | 12/1992 | Svetlik et al. |
| 4,573,556 A | 3/1986 | Andreasson | 5,184,403 A | 2/1993 | Schliemann |

| | | | | | | |
|---|---|---|---|---|---|---|
| 5,184,534 A | 2/1993 | Lee | | 5,819,625 A | 10/1998 | Sbervegliere |
| 5,198,702 A | 3/1993 | McCullough et al. | | 5,852,951 A | 12/1998 | Santi |
| 5,199,343 A | 4/1993 | Obanion | | 5,857,507 A | 1/1999 | Puzio et al. |
| 5,201,110 A | 4/1993 | Bane | | 5,861,809 A | 1/1999 | Eckstein et al. |
| 5,201,684 A | 4/1993 | DeBois, III | | 5,875,698 A | 3/1999 | Ceroll et al. |
| 5,201,863 A | 4/1993 | Peot | | 5,880,954 A | 3/1999 | Thomson et al. |
| 5,206,625 A | 4/1993 | Davis | | 5,921,367 A | 7/1999 | Kashioka et al. |
| 5,207,253 A | 5/1993 | Hoshino et al. | | 5,927,857 A | 7/1999 | Ceroll et al. |
| 5,212,621 A | 5/1993 | Panter | | 5,930,096 A | 7/1999 | Kim |
| 5,218,189 A | 6/1993 | Hutchison | | 5,937,720 A | 8/1999 | Itzov |
| 5,230,269 A | 7/1993 | Shiotani et al. | | 5,942,975 A * | 8/1999 | S.o slashed.rensen ....... 340/562 |
| 5,231,359 A | 7/1993 | Masuda et al. | | 5,943,932 A | 8/1999 | Sbervegliere |
| 5,231,906 A | 8/1993 | Kogej | | 5,950,514 A | 9/1999 | Benedict et al. |
| 5,239,879 A | 8/1993 | Plangetis | | 5,963,173 A | 10/1999 | Lian et al. |
| 5,245,879 A | 9/1993 | McKeon | | 5,974,927 A | 11/1999 | Tsune |
| 5,257,570 A | 11/1993 | Shiotani et al. | | 5,989,116 A | 11/1999 | Johnson et al. |
| 5,265,510 A | 11/1993 | Hoyer-Ellefsen | | 6,009,782 A | 1/2000 | Tajima et al. |
| 5,272,946 A | 12/1993 | McCullough et al. | | 6,018,284 A | 1/2000 | Rival et al. |
| 5,276,431 A | 1/1994 | Piccoli et al. | | 6,037,729 A | 3/2000 | Woods et al. |
| 5,285,708 A | 2/1994 | Bosten et al. | | D422,290 S | 4/2000 | Welsh et al. |
| 5,293,802 A | 3/1994 | Shiontani et al. | | 6,052,884 A | 4/2000 | Steckler et al. |
| 5,320,382 A | 6/1994 | Goldstein et al. | | 6,062,121 A | 5/2000 | Ceroll et al. |
| 5,321,230 A | 6/1994 | Shanklin et al. | | 6,070,484 A | 6/2000 | Sakamaki |
| 5,331,875 A | 7/1994 | Mayfield | | 6,095,092 A | 8/2000 | Chou |
| 5,353,670 A | 10/1994 | Metzger, Jr. | | 6,109,157 A | 8/2000 | Talesky |
| 5,377,554 A | 1/1995 | Reulein et al. | | 6,112,785 A | 9/2000 | Yu |
| 5,377,571 A | 1/1995 | Josephs | | 6,119,984 A | 9/2000 | Devine |
| 5,392,568 A | 2/1995 | Howard, Jr. et al. | | 6,131,629 A | 10/2000 | Puzio et al. |
| 5,392,678 A | 2/1995 | Sasaki et al. | | 6,133,818 A | 10/2000 | Shieh et al. |
| 5,401,928 A | 3/1995 | Kelley | | 6,141,192 A | 10/2000 | Garzon |
| 5,411,221 A | 5/1995 | Collins et al. | | 6,148,504 A | 11/2000 | Schmidt et al. |
| 5,423,232 A | 6/1995 | Miller et al. | | 6,148,526 A | 11/2000 | Kirn et al. |
| 5,436,613 A | 7/1995 | Ghosh et al. | | 6,148,703 A | 11/2000 | Ceroll et al. |
| 5,447,085 A | 9/1995 | Gochnauer | | 6,150,826 A | 11/2000 | Hokodate et al. |
| 5,451,750 A | 9/1995 | An | | 6,161,459 A | 12/2000 | Ceroll et al. |
| 5,453,903 A | 9/1995 | Chow | | 6,170,370 B1 | 1/2001 | Sommerville |
| 5,471,888 A | 12/1995 | McCormick | | 6,244,149 B1 | 6/2001 | Ceroll et al. |
| 5,480,009 A | 1/1996 | Wieland et al. | | 6,250,190 B1 | 6/2001 | Ceroll et al. |
| 5,503,059 A | 4/1996 | Pacholok | | 6,257,061 B1 | 7/2001 | Nonoyama et al. |
| 5,510,587 A * | 4/1996 | Reiter ....................... 200/341 | | 6,283,002 B1 | 9/2001 | Chiang |
| 5,510,685 A | 4/1996 | Grasselli | | 6,295,910 B1 | 10/2001 | Childs et al. |
| 5,513,548 A | 5/1996 | Garuglieri | | 6,312,028 B1 | 11/2001 | Wilkosz |
| 5,531,147 A | 7/1996 | Serban | | 6,325,195 B1 | 12/2001 | Doherty |
| 5,534,836 A | 7/1996 | Schenkel et al. | | 6,330,848 B1 | 12/2001 | Nishio et al. |
| 5,572,916 A | 11/1996 | Takano | | 6,336,273 B1 | 1/2002 | Nilsson et al. |
| 5,587,618 A | 12/1996 | Hathaway | | 6,352,137 B1 | 3/2002 | Stegall et al. |
| 5,592,353 A | 1/1997 | Shinohara et al. | | 6,357,328 B1 | 3/2002 | Ceroll et al. |
| 5,606,889 A | 3/1997 | Bielinski et al. | | 6,361,092 B1 | 3/2002 | Eagle et al. |
| 5,619,896 A | 4/1997 | Chen | | 6,366,099 B1 | 4/2002 | Reddi |
| 5,623,860 A | 4/1997 | Schoene et al. | | 6,376,939 B1 | 4/2002 | Suzuki et al. |
| 5,647,258 A | 7/1997 | Brazell et al. | | 6,404,098 B1 | 6/2002 | Kayama et al. |
| 5,648,644 A | 7/1997 | Nagel | | 6,405,624 B2 | 6/2002 | Sutton |
| 5,659,454 A | 8/1997 | Vermesse | | 6,418,829 B1 * | 7/2002 | Pilchowski .................. 83/397 |
| 5,667,152 A | 9/1997 | Mooring | | 6,420,814 B1 | 7/2002 | Bobbio |
| 5,671,633 A | 9/1997 | Wagner | | 6,427,570 B1 | 8/2002 | Miller et al. |
| 5,695,306 A | 12/1997 | Nygren, Jr. | | 6,430,007 B1 | 8/2002 | Jabbari |
| 5,700,165 A | 12/1997 | Harris et al. | | 6,431,425 B1 | 8/2002 | Moorman et al. |
| 5,720,213 A | 2/1998 | Sbervegliere | | 6,450,077 B1 | 9/2002 | Ceroll et al. |
| 5,722,308 A | 3/1998 | Ceroll et al. | | 6,453,786 B1 | 9/2002 | Ceroll et al. |
| 5,724,875 A | 3/1998 | Meredith et al. | | 6,460,442 B2 | 10/2002 | Talesky et al. |
| 5,730,165 A | 3/1998 | Philipp | | 6,471,106 B1 | 10/2002 | Reining |
| 5,741,048 A | 4/1998 | Eccleston | | 6,479,958 B1 | 11/2002 | Thompson et al. |
| 5,755,148 A | 5/1998 | Stumpf et al. | | 6,484,614 B1 | 11/2002 | Huang |
| 5,768,786 A | 6/1998 | Kane et al. | | D466,913 S | 12/2002 | Ceroll et al. |
| 5,771,742 A | 6/1998 | Bokaie et al. | | 6,492,802 B1 | 12/2002 | Bielski |
| 5,782,001 A | 7/1998 | Gray | | D469,354 S | 1/2003 | Curtsinger |
| 5,787,779 A | 8/1998 | Garuglieri | | 6,502,493 B1 | 1/2003 | Eccardt et al. |
| 5,791,057 A | 8/1998 | Nakamura et al. | | 6,530,303 B1 | 3/2003 | Parks et al. |
| 5,791,223 A | 8/1998 | Lanzer | | 6,536,536 B1 | 3/2003 | Gass et al. |
| 5,791,224 A | 8/1998 | Suzuki et al. | | 6,543,324 B2 | 4/2003 | Dils |
| 5,791,441 A | 8/1998 | Matos et al. | | 6,546,835 B2 | 4/2003 | Wang |
| 5,797,307 A | 8/1998 | Horton | | 6,564,909 B1 | 5/2003 | Razzano |
| 5,819,619 A | 10/1998 | Miller et al. | | 6,575,067 B2 | 6/2003 | Parks et al. |

| | | |
|---|---|---|
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 | 5/2005 | Harris et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,055,417 B1 | 6/2006 | Gass et al. |
| 7,077,039 B2 | 7/2006 | Gass et al. |
| 7,098,800 B2 | 8/2006 | Gass |
| 7,100,483 B2 | 9/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al. |
| 7,225,712 B2 | 6/2007 | Gass et al. |
| 7,228,772 B2 | 6/2007 | Gass |
| 7,231,856 B2 | 6/2007 | Gass et al. |
| 2002/0017175 A1 | 2/2002 | Gass et la. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0050714 A1 | 5/2002 | Imai et al. |
| 2002/0056349 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0088325 A1 | 7/2002 | Talesky et al. |
| 2002/0096030 A1 | 7/2002 | Wang |
| 2002/0096591 A1 | 7/2002 | Tanji |
| 2002/0109036 A1 | 8/2002 | Denen et al. |
| 2002/0134212 A1 | 9/2002 | Ceroll et al. |
| 2002/0170399 A1 | 11/2002 | Gass et al. |
| 2002/0170400 A1 | 11/2002 | Gass |
| 2002/0174755 A1 | 11/2002 | Behne et al. |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2003/0213349 A1 | 11/2003 | Chang |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0103544 A1 | 6/2004 | Hartmann |
| 2004/0104085 A1 | 6/2004 | Lang et al. |
| 2004/0118261 A1 | 6/2004 | Garcia et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0087049 A1 | 4/2005 | Miller et al. |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0145080 A1 | 7/2005 | Voigtlaender |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0268767 A1 | 12/2005 | Pierga et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0123960 A1 | 6/2006 | Gass et al. |
| 2006/0123964 A1 | 6/2006 | Gass et al. |
| 2006/0179983 A1 | 8/2006 | Gass et al. |
| 2006/0219076 A1 | 10/2006 | Gass et al. |
| 2006/0225551 A1 | 10/2006 | Gass |
| 2006/0230896 A1 | 10/2006 | Gass |
| 2006/0247795 A1 | 11/2006 | Gass et al. |
| 2006/0254401 A1 | 11/2006 | Gass et al. |
| 2006/0272463 A1 | 12/2006 | Gass |
| 2007/0028733 A1 | 2/2007 | Gass |
| 2007/0101842 A1 | 5/2007 | Gass |

FOREIGN PATENT DOCUMENTS

| | | |
|---|---|---|
| DE | 76186 | 8/1921 |

| | | |
|---|---|---|
| DE | 2917497 | 4/1979 |
| DE | 2800403 | 7/1979 |
| DE | 3427733 | 1/1986 |
| DE | 4205965 C1 | 2/1992 |
| DE | 4235161 A1 | 5/1993 |
| DE | 4326313 | 2/1995 |
| DE | 19609771 | 6/1998 |
| DE | 20102704 | 2/2001 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |

OTHER PUBLICATIONS

Gordon Engineering Corp., Product Catalog, pgs. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,430, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challenges Award Official Entry Form, submitted Apr. 26. 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10 Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10 Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
The Merlin Splitter by Excalibur a Sommerville Design Product Overview & Generic Installation Notes, Sommerville Design & Manufacturing Inc., atleast as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
Accu-Fence® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Operator Injury Mitigation Using Electronic Sensing and Mechanical Braking and Decoupling Devices in Handheld Circular Saws, Erin F. Eppard, date unknown.
Laguna Tools table saw owner's manual, date unknown.

* cited by examiner

SWITCH BOX FOR POWER TOOLS WITH SAFETY SYSTEMS

CROSS-REFERENCE TO RELATED APPLICATION

This application is a continuation of U.S. patent application Ser. No. 11/027,322, filed Dec. 31, 2004 now abandoned, which claims the benefit of and priority from U.S. Provisional Patent Application Ser. No. 60/533,598, filed Dec. 31, 2003.

This application is also a continuation of U.S. patent application Ser. No. 09/676,190, filed Sep. 29, 2000 now U.S. Pat. No. 7,055,417, which claims the benefit of and priority from U.S. Provisional Patent Application Ser. No. 60/157,340, filed Oct. 1, 1999 and U.S. Provisional Patent Application Ser. No. 60/182,866, filed Feb. 16, 2000.

This application is also a continuation of the following U.S. Patent Applications: Ser. No. 09/929,221, filed Aug. 13, 2001 now U.S. Pat. No. 7,284,467, Ser. No. 09/929,227, filed Aug. 13, 2001 now U.S. Pat. No. 7,308,843, Ser. No. 09/929,234, filed Aug. 13, 2001 now U.S. Pat. No. 7,225,712, Ser. No. 09/929,235, filed Aug. 13, 2001 now U.S. Pat. No. 7,350,444, Ser. No. 09/929,236, filed Aug. 13, 2001, Ser. No. 09/929,237, filed Aug. 13, 2001, Ser. No. 09/929,238, filed Aug. 13, 2001 now abandoned, Ser. No. 09/929,240, filed Aug. 13, 2001 now U.S. Pat. No. 7,100,483, Ser. No. 09/929,242, filed Aug. 13, 2001, Ser. No. 09/929,425, filed Aug. 13, 2001 now U.S. Pat. No. 7,137,326, Ser. No. 09/929,426, filed Aug. 13, 2001 now U.S. Pat. No. 7,210,383, Ser. No. 10/053,390, filed Jan. 16, 2002 now U.S. Pat. No. 7,377,199, Ser. No. 10/100,211, filed Mar. 13, 2002, Ser. No. 10/146,527, filed May 15, 2002, Ser. No. 10/172,553, filed Jun. 13, 2002 now U.S. Pat. No. 7,231,856, Ser. No. 10/189,027, filed Jul. 2, 2002, Ser. No. 10/189,031, filed Jul. 2, 2002 now U.S. Pat. No. 7,171,879, Ser. No. 10/243,042, filed Sep. 13, 2002 now U.S. Pat. No. 7,197,969, Ser. No. 10/292,607, filed Nov. 12, 2002 now U.S. Pat. No. 7,077,039, Ser. No. 10/341,260, filed Jan. 13, 2003 now abandoned, Ser. No. 10/345,630, filed Jan. 15, 2003, Ser. No. 10/643,296, filed Aug. 18, 2003 now abandoned, Ser. No. 10/794,161, filed Mar. 4, 2004 now U.S. Pat. No. 7,098,800, Ser. No. 10/923,273, filed Aug. 20, 2004 now U.S. Pat. No. 7,350,445, Ser. No. 10/923,282, filed Aug. 20, 2004 now abandoned, Ser. No. 10/923,290, filed Aug. 20, 2004, Ser. No. 10/932,339, filed Sep. 1, 2004 now U.S. Pat. No. 7,290,472, Ser. No. 10/984,643, filed Nov. 8, 2004, Ser. No. 11/026,006, filed Dec. 31, 2004, Ser. No. 11/026,114, filed Dec. 31, 2004, Ser. No. 11/027,254, filed Dec. 31, 2004 now abandoned, Ser. No. 11/027,322, filed Dec. 31, 2004 now abandoned, Ser. No. 11/027,600, filed Dec. 31, 2004, Ser. No. 11/045,972, filed Jan. 28, 2005, Ser. No. 11/061,162, filed Feb. 18, 2005 now U.S. Pat. No. 7,228,772, Ser. No. 11/098,984, filed Apr. 4, 2005 now U.S. Pat. No. 7,353,737, Ser. No. 11/107,499, filed Apr. 15, 2005, Ser. No. 11/190,111, filed Jul. 25, 2005 now U.S. Pat. No. 7,357,056, Ser. No. 11/208,214, filed Aug. 19, 2005, Ser. No. 11/218,356, filed Sep. 2, 2005, Ser. No. 11/256,757, filed Oct. 24, 2005, Ser. No. 11/348,580, filed Feb. 6, 2006, Ser. No. 11/353,423, filed Feb. 13, 2006, Ser. No. 11/395,502, filed Mar. 31, 2006, titled Table Saw Throat Plates and Table Saws Including the Same, of inventors Stephen F. Gass, J. David Fulmer and David A. Fanning, and Ser. No. 11/401,050, filed Apr. 10, 2006, titled Brake Mechanism for Power Equipment, of inventors Stephen F. Gass, Joel F. Jensen, Anwyl M. McDonald, David S. D'Ascenzo, and Andrew L. Johnston.

All of the above applications are hereby incorporated by reference in their entirety for all purposes.

FIELD

The present invention relates to power tools and more particularly to switch boxes for power tools with safety systems.

BACKGROUND

Safety systems are often employed with power equipment such as table saws, miter saws, band saws, jointers, shapers, circular saws and other machinery, to minimize the risk of injury when using the equipment. Some safety systems include an electronic system to detect the occurrence of a dangerous condition and a reaction system to minimize any possible injury from the dangerous condition. For example, the detection system may detect when the hand of a user approaches or contacts a moving blade, and the reaction system may stop, retract, disable or cover a moving blade upon detection of the dangerous condition.

The present document discloses switch boxes for use on power equipment with safety systems.

DETAILED DESCRIPTION

Figure 1:
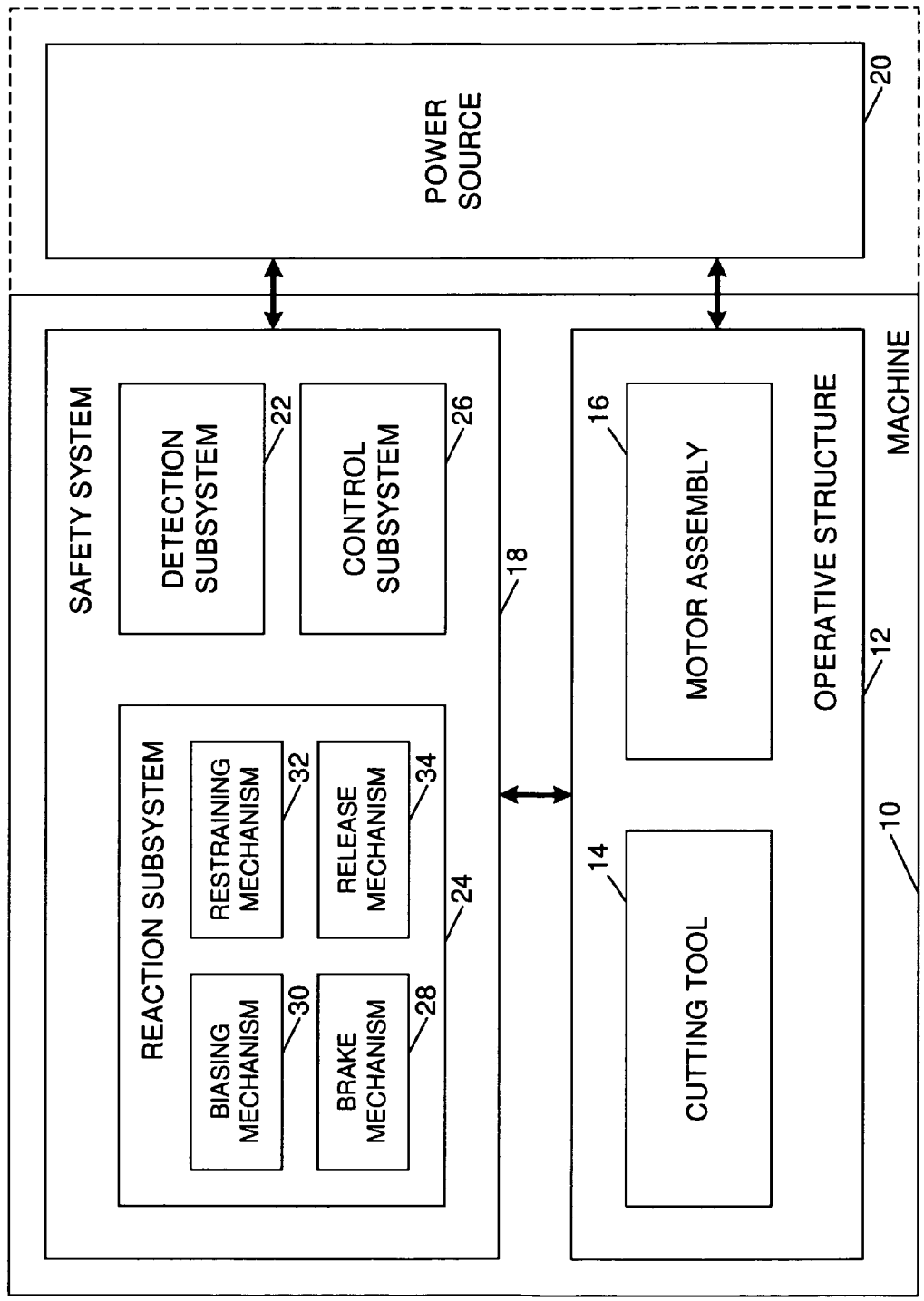
FIG. 1 is a schematic block diagram of a machine with a fast-acting safety system.

A machine that incorporates a safety system is shown schematically in FIG. 1 and indicated generally at 10. Machine 10 may be any of a variety of different machines, such as table saws, miter saws, band saws, jointers, shapers, circular saws, routers, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. patent application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
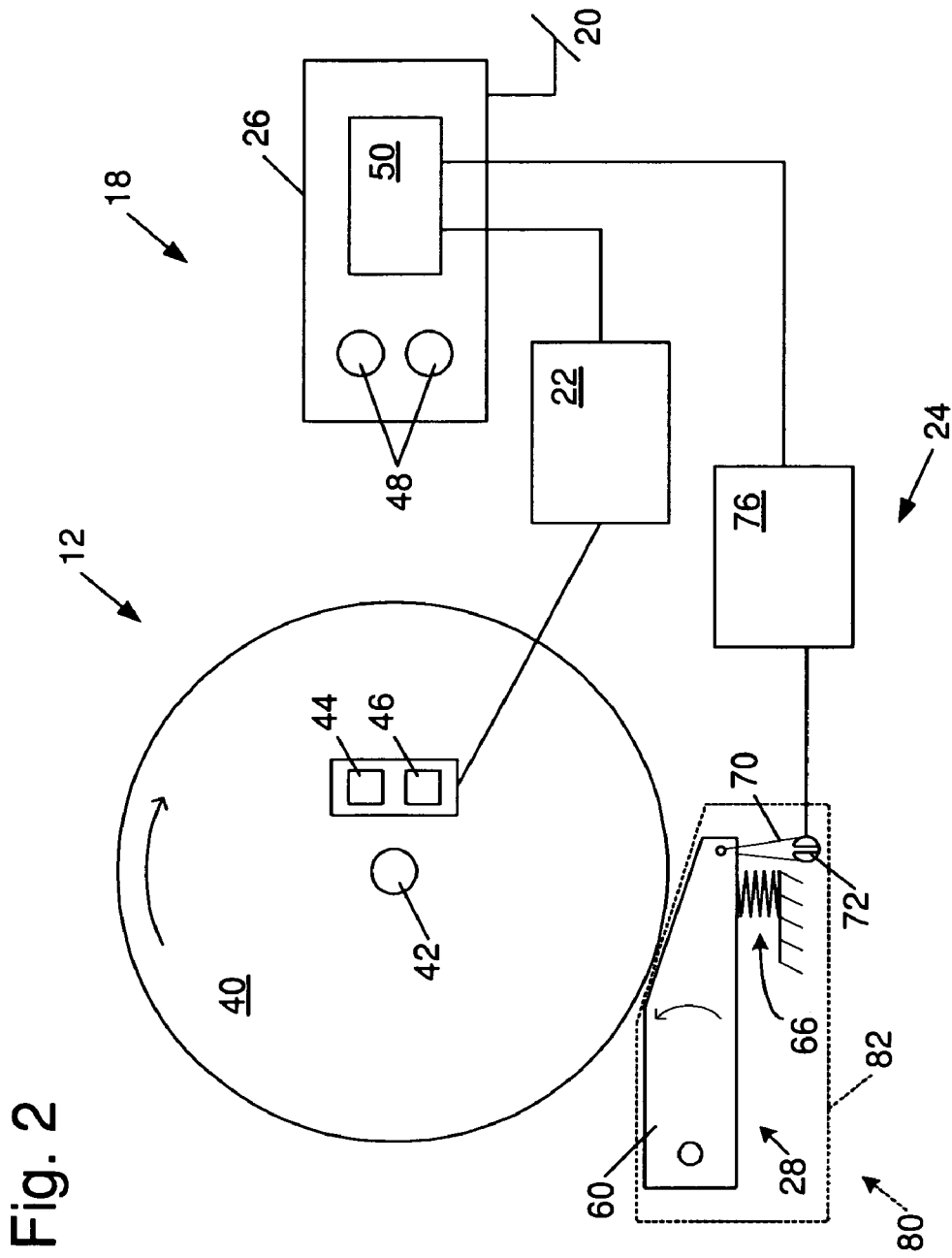
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," and U.S. Provisional Patent Application Ser. No. 60/496,550, entitled "Table Saws With Safety Systems," the disclosures of which are herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. Patent Application Publication No. 2003/0090224 A1, entitled "Detection System for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," and U.S. Patent Application Publication No. 2003/0058121 A1, entitled "Logic Control With Test Mode for Fast-Acting Safety System," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Provisional Patent Application Ser. No. 60/496,568, entitled "Motion Detecting System for use in a Safety System for Power Equipment," the disclosures of which are herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

Figure 3:
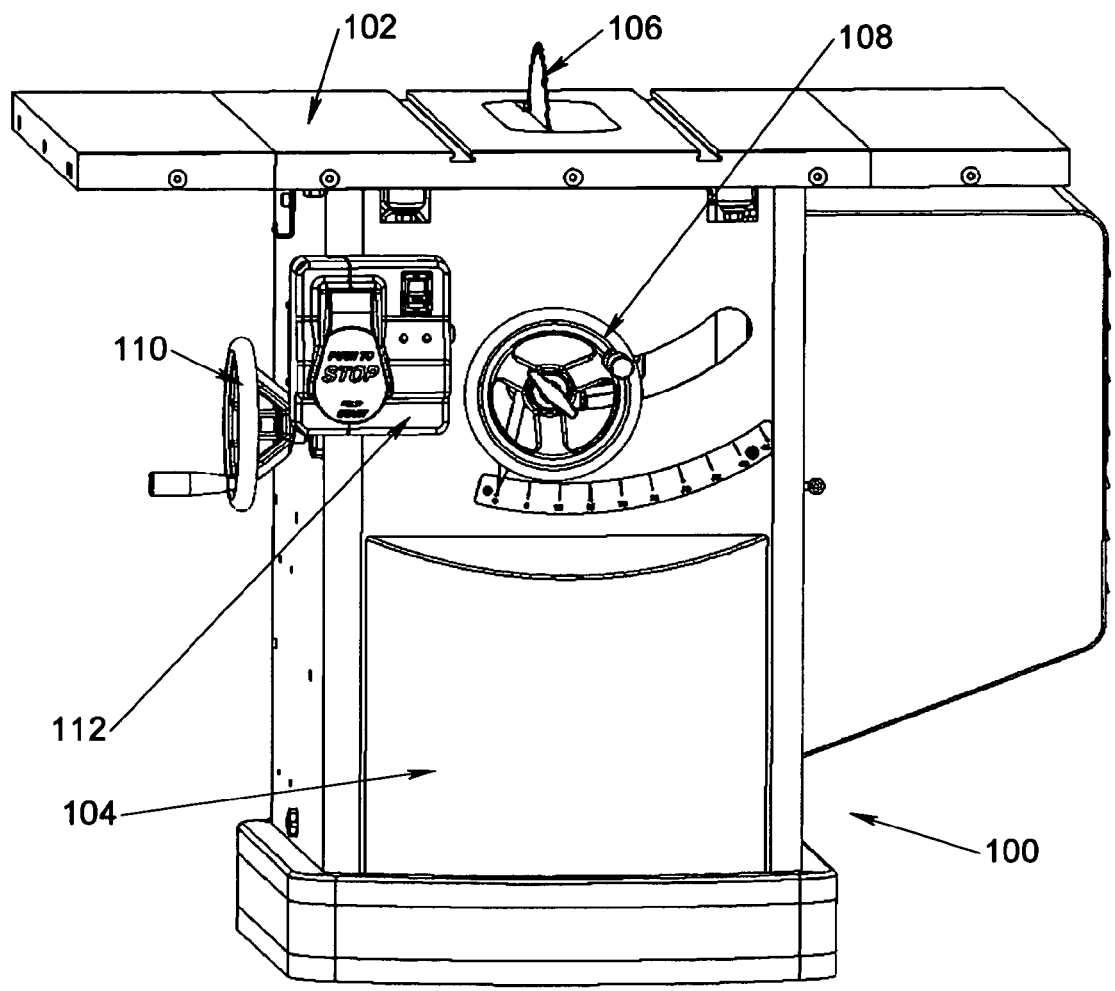
FIG. 3 is a perspective view of a table saw with a switch box.
Figure 4:
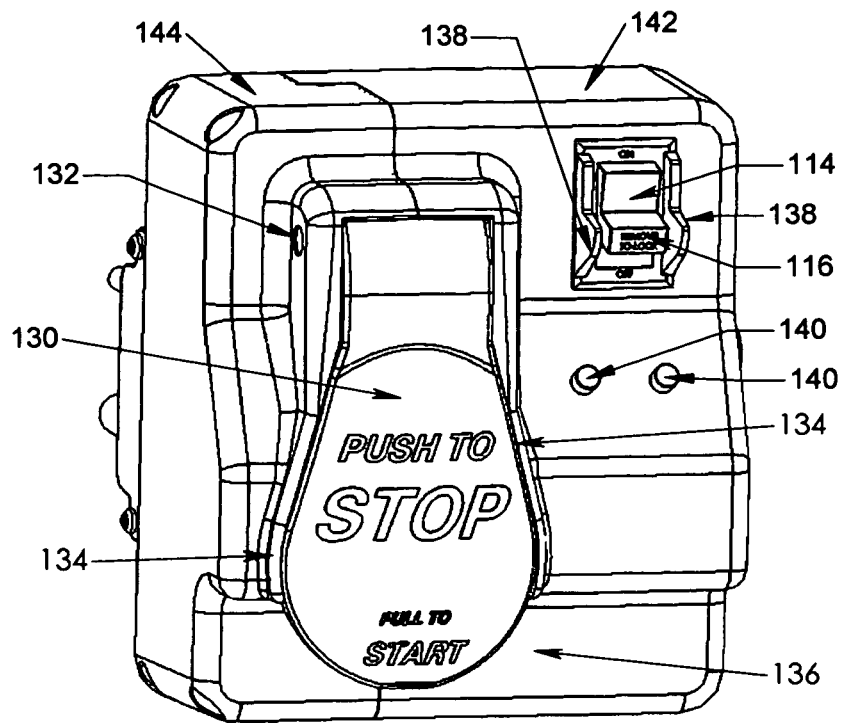
FIG. 4 shows an embodiment of a switch box.

FIG. 3 shows a table saw 100, often called a cabinet saw or tilting-arbor saw, that may include a safety system as described above. Saw 100 includes a table 102 on which a work piece may be cut. The table is mounted on a cabinet 104. A blade 106 extends up through a slot in the table to cut a work piece. A motor assembly (not shown) is supported inside the cabinet to drive the blade. Hand wheels 108 and 110 may be turned to adjust the elevation of the blade (the height the blade extends above the table) and the tilt of the blade relative to the tabletop. In operation, a user makes a cut by pushing a work piece on the table past the spinning blade.

Saw 100 and its safety system are controlled by a switch box 112 mounted on the saw. The switch box is shown in more detail in FIGS. 4 through 7. The switch box may be mounted to the saw in any known manner, such as by screws extending through mounting flanges. One mounting flange is identified in FIG. 5 at 113. The switch box typically would include at least part of the electronics necessary to control the operation of the saw.

Switch box 112 includes a power switch 114 that switches power to the control subsystem of the saw. In other words, when switch 114 is on, electricity is supplied to circuitry that is part of the control subsystem. Power switch 114 includes a removable actuator 116. The switch will function when the actuator is present, but cannot be turned on if the actuator is removed. Using a switch with a removable actuator allows a person to control the use of the saw and prevent unauthorized or accidental operation of the switch.

Figure 5:
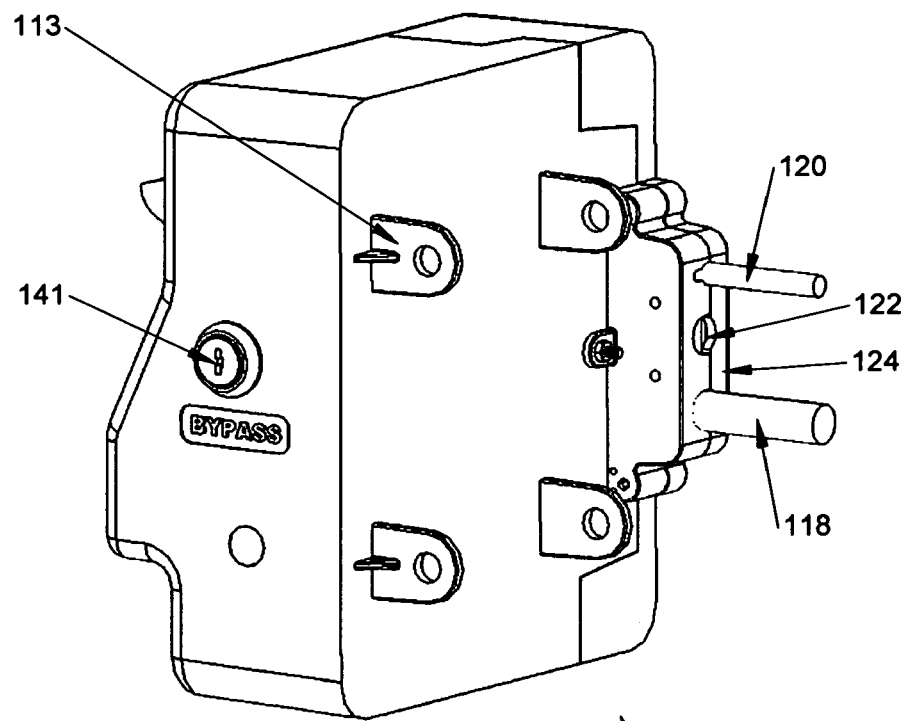
FIG. 5 shows the back of the switch box of FIG. 4.
Figure 6:
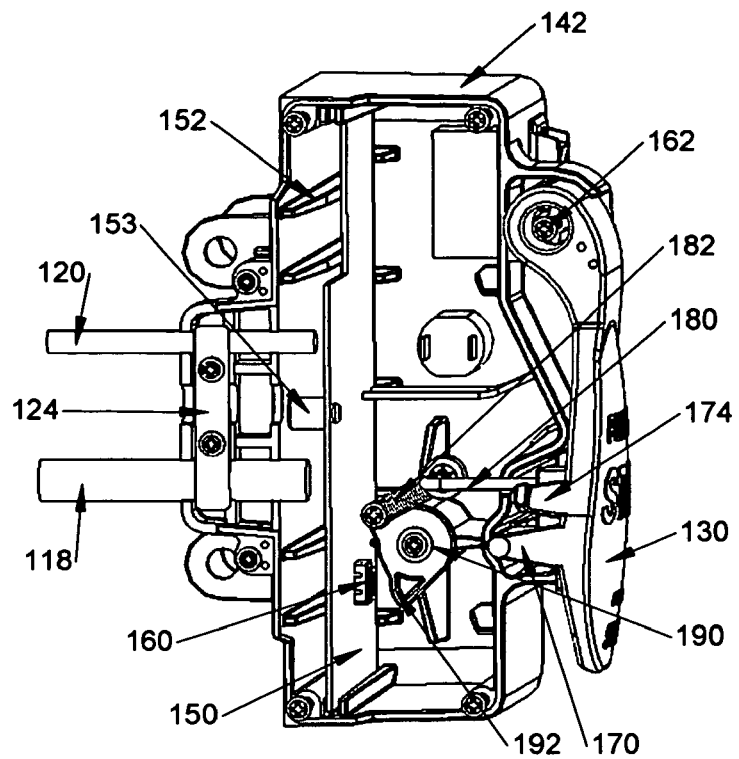
FIG. 6 shows the right half of the switch box of FIG. 4.

Power is supplied to switch box 112 by a cord 118 entering into the switch box through the back, as shown in FIG. 5. Cord 118 passes through a strain relief 124 as it enters the switch box. The strain relief is made from a metal plate that clamps over the cords as shown in FIG. 6. Signals may be sent out of the switch box through cord 120 or, in some applications, through another cord that would exit the switch box from aperture 122. The cords may connect to various parts of the machine, such as to the reaction system, to a brake cartridge and/or to a motor.

Switch box 112 also includes a start/stop paddle switch 130 mounted to pivot in and out around pivot 132. Paddle switch 130 is designed so that a predetermined function of the tool, such as starting the blade spinning in a table saw, is accomplished by pulling the paddle out. Pushing the paddle in causes the predetermined function to stop. Paddle switch 130 is sized large enough so that it can be easily accessed and actuated by a user. For example, a user can bump the paddle switch with a knee or thigh or slap the switch with the palm to stop the predetermined function in a potentially dangerous situation. Paddle switch 130 will not start the predetermined function, however, until and unless power switch 114 is turned on.

Switch box 112 is formed with projections or walls 134 that extend out and around paddle switch 130 to prevent accidental contact with the paddle causing the tool to start. The switch box is also formed with an indentation 136. An end of paddle switch 130 extends out and over indentation 136 so a user can reach under the paddle to pull it out and start the machine. Power switch 114 also has walls 138 to protect the power switch from being turned on by accidental contact.

Switch box 112 includes a user interface to indicate the status of the machine. In the embodiment shown in FIG. 4 the user interface comprises two light-emitting diodes 140. One diode may be red, for example, and it could be used to signal a problem or error with the machine. The other diode may be green and it could be used to indicate that the machine is okay and ready to use. The diodes also indicate when power switch 114 is turned on. Alternatively, only one diode or more than two diodes may be used as a user interface, or a LCD display may be used instead of diodes. The user interface may be positioned on an angled surface, as shown, so that it is easier to see by a user standing over the switch box.

Switch box 112 also includes a bypass switch 141 shown in FIG. 5. The bypass switch is used to deactivate the safety system when desired. In the depicted embodiment, the bypass switch is a key switch, so it can only be used with a specific key.

Figure 7:
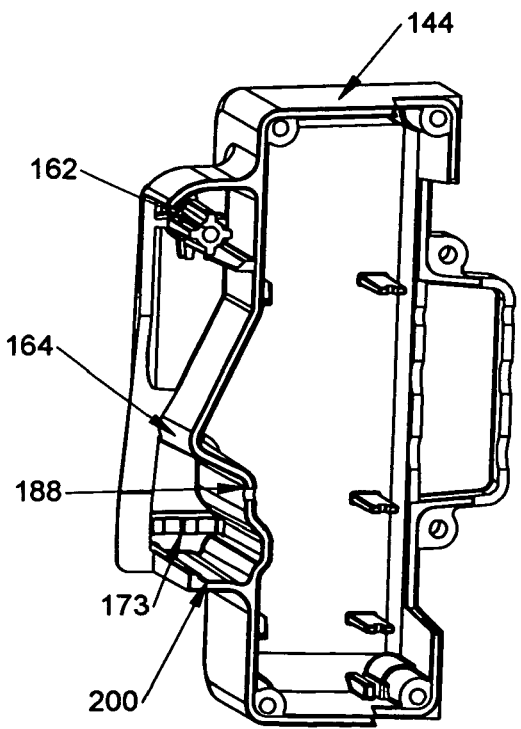
FIG. 7 shows the left half of the switch box of FIG. 4.

Switch box 112 is assembled from two halves 142 and 144 that are screwed together. Each half typically would be a molded part made of a plastic such as ABS. Right half 142 is the larger of the two halves and it is shown in FIG. 6. It houses a circuit board 150 (which is part of the control subsystem) supported by plastic flanges and tabs, such as flange 152. The flanges and tabs are configured to hold circuit board 150 in place. The circuit board also may be held in place by a spacer and screw, as shown at 153 in FIG. 6. Power switch 114, cables 118 and 120, paddle switch 130, LEDs 140, and bypass switch 141 would all be electrically connected to the circuit board. Left half 144 of the switch box is shown in FIG. 7, and it acts as a lid or cover for right half 142. With this construction, a user may remove left half 144 to service circuit board 150 or other components without having to remove the switch box from the machine and without having to disconnect switches or other components from the switch box.

Paddle switch 130 is designed to activate a small tactile switch 160 mounted on circuit board 150. The tactile switch is an electronic component that may be used in the control subsystem to control the function of the machine. Typically, the control subsystem will include a microprocessor, and the tactile switch would be a logic switch.

Tactile switch 160 provides an economical way to control the operation of the machine. However, a tactile switch typically requires only a small movement and minimal force to operate, while a user of a machine such as a table saw is accustomed to a switch that requires significant force to operate and that has a solid movement and feel. Paddle switch 130 is designed to provide the user with a robust switch having a positive movement while at the same time triggering tactile switch 160 with only the required force.

Figure 8:
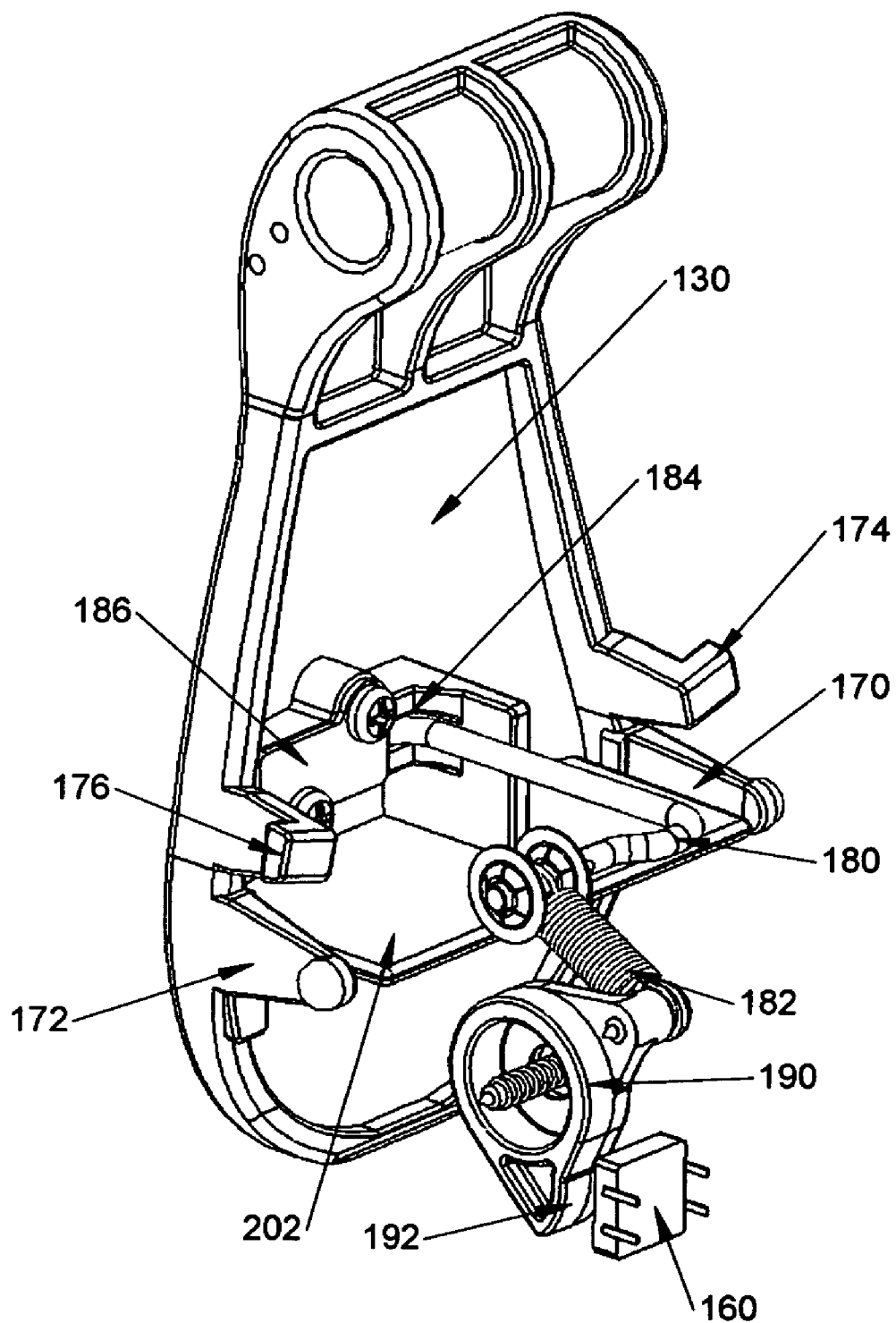
FIG. 8 shows a paddle switch used in the switch box of FIG. 4.

Paddle switch 130 is sandwiched on corresponding posts 162 on the right and left halves of the switch box, as shown in FIGS. 6 and 7. The outer surfaces of the two halves under the paddle switch each include a projection 164 that acts as a stop to limit the inward pivoting of the paddle switch. A perspective view of the back of paddle switch 130 is shown in FIG. 8, and it includes two tabs 170 and 172, each tab extending inwardly relative to the switch box from one side of the large end of the paddle. The tabs mesh with corresponding surfaces on the two halves of the switch box, such as surface 173 shown in FIG. 7, to provide friction when the paddle is pulled out or pushed in. The two tabs and corresponding surfaces also provide a definite engagement and they may be configured so the paddle "clicks" or "snaps" into place as it moves. Paddle 130 also includes stops 174 and 176 that mesh with corresponding surfaces on the two halves of the switch box to prevent the paddle from being pulled out too far.

A connecting link 180 extends between paddle switch 130 and a spring 182. One end of the link is held in a trough 184 in the underside of the paddle switch by a plate 186 that is screwed down over the link. In this manner, the link can pivot slightly in the trough but cannot escape. The link then extends through an aperture 188 in the switch box and connects to spring 182. Spring 182, in turn, is connected to an actuator 190 mounted to pivot in the switch box adjacent tactile switch 160. Actuator 190 includes a tab 192, as shown.

When a user pulls paddle switch 130 out, link 180 moves out and stretches spring 182. Spring 182, in turn, causes actuator 190 to pivot and tab 192 to contact and trigger tactile switch 160. Spring 182 acts as a force regulator and limiter to prevent too much force being applied to the tactile switch. Thus, a user may pull paddle switch 130 out with a substantial force while spring 182 causes actuator 190 to apply a regulated, smaller force to the tactile switch. When a user pushes the paddle switch back in to turn off the machine, link 180 moves in and causes spring 182 to move together. The spring then pushes actuator 190 away from the tactile switch. Additionally, the tactile switch in biased toward the off position with a small internal spring force, so the tactile switch itself pushes actuator 190 away when the paddle switch is moved in.

The switch box is essentially totally enclosed, except for aperture 188 under the paddle, to prevent dust from entering into the switch box. The switch box also includes a wall 200 under paddle switch 130, and paddle 130 includes a corresponding wall 202 extending in toward the switch box. Those walls limit how far a person may reach under the paddle. The walls also protect connecting link 180 under the paddle.

Switch box 112 has been discussed as mounted on a table saw. Of course, the switch box may be used with other types of machines and with other power tools having various safety systems.

INDUSTRIAL APPLICABILITY

The systems and components disclosed herein are applicable to power equipment. It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A switch box for use with a woodworking machine having a cutting blade, a motor adapted to move the blade, a control subsystem adapted to control the motor, and a safety system to detect contact or proximity between a person and the blade, the switch box comprising:
    a housing;
    a first switch at least partially supported by the housing and switchable between an "off" position and an "on" position in which power is switched to the control subsystem and to the safety system so that the safety system can function as intended if it is operable;
    a second switch at least partially supported by the housing and configured to trigger the operation of the motor, where the second switch will not trigger the operation of the motor until after the first switch has switched power to the control subsystem and to the safety system; and
    a light system that illuminates when the first switch is in the "on" position regardless of the operability of the safety system, where the light system illuminates in a first manner to indicate if the safety system is operable and where the light system illuminates in a second manner distinguishable from the first manner to indicate if the safety system is inoperable.

2. The switch box of claim 1, where the second switch is a paddle switch.

3. The switch box of claim 1, where the first switch includes a portion that may be removed to disable the switch from switching power to the control subsystem.

4. The switch box of claim 1, where the light system includes at least two light emitting diodes.

5. The switch box of claim 1, where the light system includes a green light and a red light.

6. The switch box of claim 1, where the light system includes a first light to illuminate in the first manner and a second light to illuminate in the second manner.

7. The switch box of claim 1, for use with a woodworking machine having a bypass system to deactivate the safety system, where the light system illuminates in a third manner distinguishable from the first and second manners to indicate the bypass system has deactivated the safety system.

8. The switch box of claim 1, where the light system includes a green light to illuminate in the first manner and a red light to illuminate in the second manner.

9. The switch box of claim 1, where the light system includes a green light to illuminate in the first manner and a red light to illuminate in the second manner, and where at least one of the green and red lights illuminates when the first switch is switched to the "on" position.

\* \* \* \* \*